US008010936B2

(12) United States Patent
Brown et al.

(10) Patent No.: US 8,010,936 B2
(45) Date of Patent: Aug. 30, 2011

(54) SYSTEM AND METHOD FOR DESCRIBING METHOD PROCESS USING GUIDED ARCHITECTURAL DECISIONS

(75) Inventors: Alan William Brown, Raleigh, NC (US); Simon K. Johnston, Siler City, NC (US); John Smith, Chatswood (AU)

(73) Assignee: International Business Machines Corporation, Armonk, NY (US)

( * ) Notice: Subject to any disclaimer, the term of this patent is extended or adjusted under 35 U.S.C. 154(b) by 1111 days.

(21) Appl. No.: 11/763,016

(22) Filed: Jun. 14, 2007

(65) Prior Publication Data
US 2008/0313597 A1 Dec. 18, 2008

(51) Int. Cl.
*G06F 9/44* (2006.01)
(52) U.S. Cl. ......................................... 717/101
(58) Field of Classification Search .................. 717/101
See application file for complete search history.

(56) References Cited

U.S. PATENT DOCUMENTS

| | | | |
|---|---|---|---|
| 6,701,257 B2 | 3/2004 | Sakurai et al. ................ 702/30 |
| 6,877,153 B2* | 4/2005 | Konnersman ................. 717/101 |
| 6,915,239 B2 | 7/2005 | Bergman et al. ............. 702/188 |
| 7,031,888 B2 | 4/2006 | Astorino ........................ 703/1 |
| 7,120,156 B2 | 10/2006 | Foti et al. ...................... 370/401 |
| 2003/0074648 A1* | 4/2003 | Brassard et al. ............. 717/101 |
| 2004/0103058 A1* | 5/2004 | Hamilton ....................... 705/38 |
| 2005/0132324 A1* | 6/2005 | Guyette ......................... 717/101 |
| 2008/0162382 A1* | 7/2008 | Clayton et al. ................ 705/500 |

OTHER PUBLICATIONS

Bui et al., "Communications Design for Co-oP: A Group Decision Support System"; ACM Apr. 1986, vol. 4 pp. 81-103.*
Abrams S. et al, "Architectural Thinking and Modeling with the Architects' Workbench", IBM Systems Journal vol. 45, 2006.*
Cao et al., "An asynchronous group decision support system study for intelligent multi-criteria," Proceedings of the 32nd Hawaii International Conference on System Sciences—1999, 9 pages.
Bui et al., "Communications Design for Co-oP: A Group Decision Support System," ACM Transactions on Office Information Systems, vol. 4, No. 2, Apr. 1986, pp. 81-103.
Dumont et al., "Perceptually-Driven Decision Theory for Interactive Realistic Rendering," ACM Transactions on Graphics, vol. 22, No. 2, Apr. 2003, pp. 152-181.
Kazman et al., "Quantifying the Costs and Benefits of Architectural Decisions," IEEE/ ACM Digital Library, 2001, p. 297-306.
Chien-Chih Yu, "A Web-Based Consumer-Oriented Intelligent Decision Support System for Personalized E-Services," ICEC'04, Sixth International Conference on Electronic Commerce, 2004, p. 429-437.

* cited by examiner

*Primary Examiner* — Wei Zhen
*Assistant Examiner* — Junchun Wu
(74) *Attorney, Agent, or Firm* — VanLeeuwen & VanLeeuwen; Joseph E. Bracken

(57) ABSTRACT

A method author uses a method generator to create a customized project-specific method that includes first class decision elements. The decision elements are included in a meta model for a process framework, and describe actual decisions for a user to resolve. Once created, a method advisor uses the project-specific method to guide a user through architectural decisions by refining the project-specific method's process flow based upon the user's decisions. The refining includes removing activity elements and decision elements from the process flow that are not reachable by a path corresponding to the user's choice selection. The method advisor also stores the user's choice selections, along with considerations, conditions, and consequences, for the use to view at a later date.

16 Claims, 6 Drawing Sheets

SYSTEM AND METHOD FOR DESCRIBING METHOD PROCESS USING GUIDED ARCHITECTURAL DECISIONS

BACKGROUND OF THE INVENTION

1. Technical Field

The present invention relates to a system and method for creating a project-specific software development method that includes first class decision elements that guide and document a user's architectural decisions for a project.

2. Description of the Related Art

Today's software development method frameworks describe activities at a high level and describe decisions within the text of the activity description or supporting material. In addition, current processes that software development methods describe are focused on activities performed, which may include either implicit or explicit decisions for which a user is aware. In today's software development environment, it would be desirable to have a software development process that actively guides the user through an architectural decision process for the user's project.

SUMMARY

It has been discovered that the aforementioned challenges are resolved using a system and method for creating a project-specific software development method that includes first class decision elements that guide and document a user's architectural decisions. A method author uses a method generator to create a customized project-specific method that includes first class decision elements. In turn, a method advisor uses the customized project-specific method to guide a user through architectural decisions by refining the project-specific method's process flow based upon the user's decisions.

A method author provides project requirements to a method generator, which the method generator analyzes and determines whether a template exists in a template library that meets the project requirements. When a template meets the project requirements, the method generator retrieves the template, which may include program-specific decisions and/or environment-specific decisions that, as a result, allow the method author to create the project-specific method with less effort.

The method author provides decision attributes to the method generator, which may include program-specific decision attributes, environment-specific decision attributes, and/or project/customer-specific decision attributes. In turn, the method generator creates decision elements from the decision attributes and includes the decision elements in a project-specific method, which is stored in a repository. The project-specific method includes activity elements and decision elements that are linked together that comprise a process flow. In addition, the method author may instruct the method generator to store the project-specific method in the template library for later use with a different project.

Once stored in the repository, a user instructs a method advisor to retrieve the project-specific method. In turn, the method advisor describes the project-specific method, which proceeds through a series of steps to guide the user through architectural decisions based upon the project-specific method's process flow. While guiding the user through architectural decisions, the method advisor provides decision criteria to the user that correspond to the decision elements included in the project-specific method. The decision criteria include choices, considerations, and consequences.

The user reviews the decision criteria, and provides a choice selection to the method advisor. In turn, the method advisor refines the project-specific method's process flow based upon the choice selection, such as removing downstream activity elements and downstream decision elements from the process flow that are not reachable by a path corresponding to the choice selection. In addition, the method advisor stores the choice selection such that the user may review the choice selection at a later date. The method advisor continues to provide decision criteria for remaining decision elements and refines the project-specific method's process flow accordingly, thus guiding the user through the project's architectural decisions.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
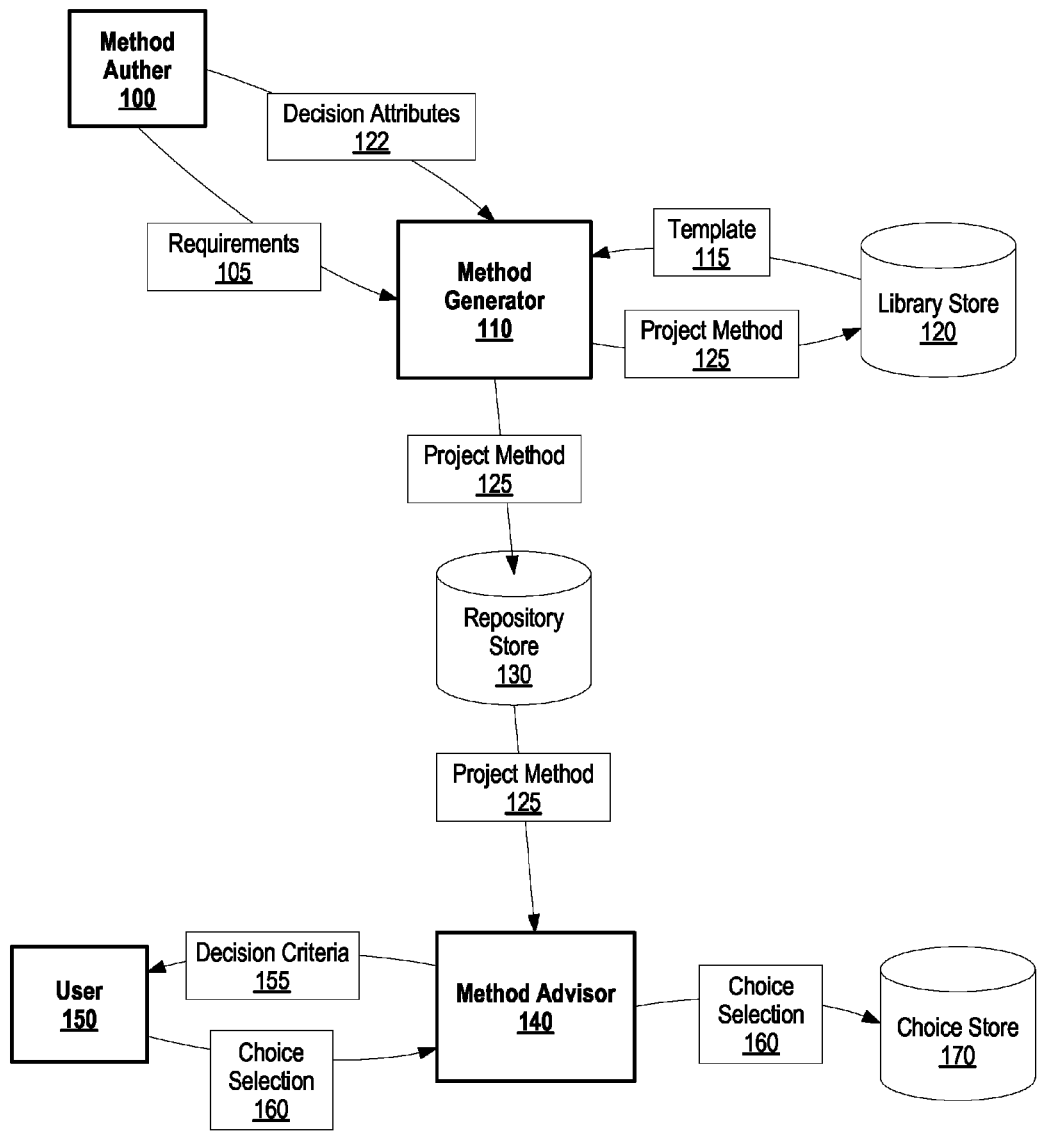
FIG. 1 is a diagram showing a method author creating a project-specific method that includes a first class decision element and a method advisor using the project-specific method to guide a user's architectural decisions.

FIG. 1 is a diagram showing a method author creating a project-specific method that includes a first class decision element and a method advisor using the project-specific method to guide a user's architectural decisions. Method author 100 uses method generator 110 to create a customized project-specific method (project-specific method 125) for use by user 150. Method author 100 begins by providing requirements 105 to method generator 110, such as Rational Method Composer. Method generator 110 analyzes requirements 105 and determines whether a template exists in library store 120 that meets requirements 105. Library store 120 may be stored on a nonvolatile storage area, such as a computer hard drive.

When a template meets requirements 105, method generator 110 retrieves the template (template 115) from library store 120. For example, template 115 may be a "delivery process" in RUP (Rational Unified Process), or an "engagement model" in GS Method (Global Services Method). Template 115 may include program specific decisions and environment-specific decisions that, as a result, allow method author 100 to create project-specific method 125 with less effort.

Method author 100 provides decision attributes 122 to method generator 110, which may include program-specific decision attributes, environment-specific decision attributes, and/or project/customer-specific decision attributes. For example, a program-specific decision attribute may be "Selection of Deployment Platform"; an environmental decision attribute may be "Selection of Platform Version"; and a project/customer decision attribute may be "Selection of Hosting Location".

Method generator 110 creates decision elements from decision attributes 122 and includes the decision elements in project-specific method 125, which is stored in repository store 130. Project-specific method 125 includes activity elements and decision elements that are linked together that comprise a process flow (see FIG. 2, 4, and corresponding text for further details). In addition, method author 100 may instruct method generator 110 to store project-specific method 125 in library store 120 for later use as a template. Repository store 130 may be stored on a nonvolatile storage area, such as a computer hard drive.

Once stored in repository store 130, user 150 instructs method advisor, such as the Process Advisor in Rational Software Architect, 140 to retrieve project-specific method 125 from repository store 130. Method advisor 140 invokes project-specific method 125, which proceeds through a series of steps to guide user 150 through architectural decisions based upon project-specific method 125's process flow.

While guiding user 150 through architectural decisions, method advisor 140 provides decision criteria 155 to user 150 that correspond to the decision elements included in project-specific method 125. Decision criteria 155 include choices, considerations, and consequences. Choices are predefined choices from which user 150 may select, such as "CICS on zOS," "WebSphere Distributed," or "PHP." The user may also provide a choice selection that is not pre-defined (see FIG. 5 and corresponding text for further details). Considerations describe a consideration that user 150 should understand when making a decision. For example, "system performance" may be a consideration and, as a result, user 150 may not wish to choose PHP (Personal Home Page) as a platform. Consequences describe one or more consequences of a particular choice. For example, a consequence may inform user 150 that when choosing "CICS on zOS," user 150 must also have certain CICS web service connectors available.

User 150 reviews decision criteria 155, and provides choice selection 160 to method advisor 140. In turn, method advisor 140 refines project-specific method 125's process flow based upon choice selection 160. Meaning, method advisor 140 removes activity elements and decision elements from the process flow that are not reachable by a path corresponding to choice selection 160 (see FIG. 3B and corresponding text for further details). Method advisor 140 also stores choice selection 160 in choice store 170 such that user 150 may review choice selection 160 at a later date. Method advisor 140 continues to provide decisions criteria 155 for subsequent decisions and refine project-specific method 125's process flow accordingly, thus guiding user 150 through the project's architectural decisions.

Figure 2:
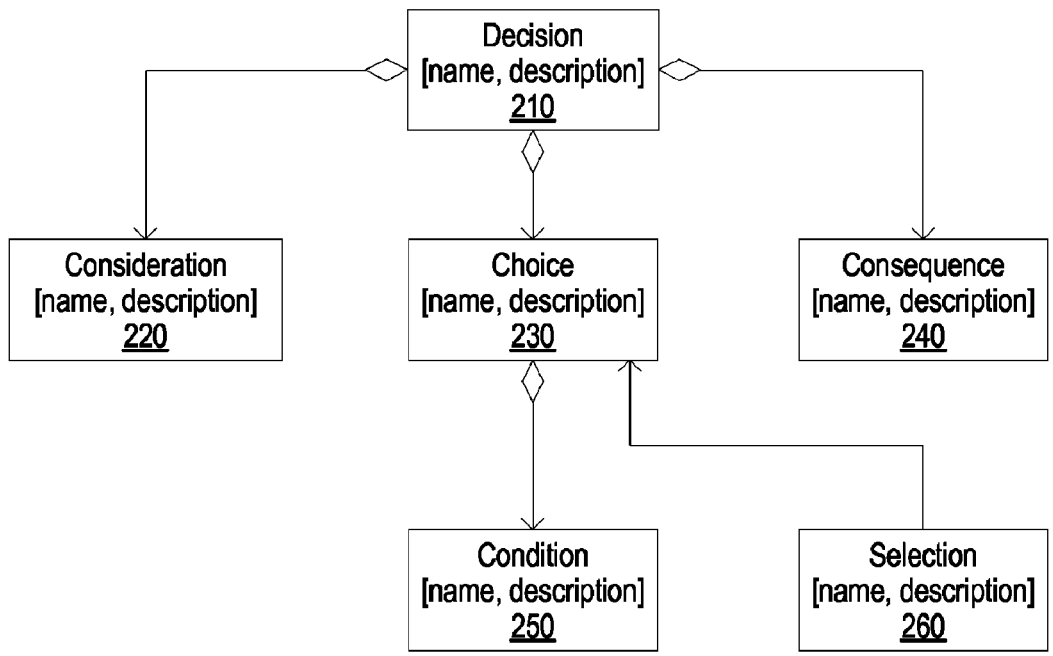
FIG. 2 is an element diagram showing a decision element as a first class element that includes corresponding sub-elements.

FIG. 2 is an element diagram showing a decision element as a first class element that includes corresponding sub-elements. Element diagram 200 includes first class decision element 210 and a set of sub-elements that support decision element 210. Decision element 200 is included into a meta model for process frameworks and describes an actual decision for a user to resolve, such as "Select runtime platform for identified service."

Choice sub-element 230 describes a possible set of predefined choices from which a user may select, such as "CICS on zOS," "WebSphere Distributed," or "PHP." Consideration sub-element 220 describes a consideration that the user should understand when making a decision. Each choice sub-element 230 has a set of corresponding considerations.

Consequence sub-element 240 describes one or more consequences of a particular choice. For example, a consequence may inform a user that when choosing "CICS on zOS," the user must have certain CICS web service connectors available. Condition sub-element 250 describes a condition under which a choice is restricted. For example, a condition may restrict a user's choice due to an earlier decision that requires all new services to be implemented in CICS.

Selection sub-element 260 captures a user's choice selection during process execution, which includes criteria used to make the decision and the rationale for the choice selection. For example, criteria may be based upon overall development cost and, as a result, a choice selection may chose to implement a project using CICS due to the number of available skilled method authors.

Figure 3A:
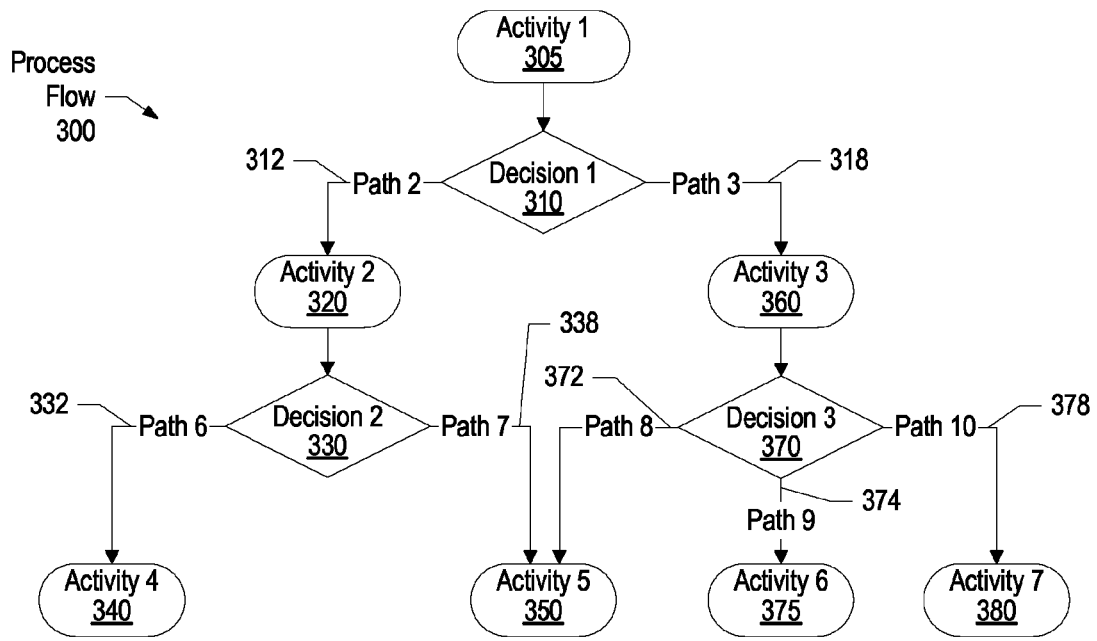
FIG. 3A is a process flow that includes various activity elements and decision elements.

FIG. 3A is a process flow that includes various activity elements and decision elements. Process flow 300 includes activity 1 305 and linked decision element 1 310. Decision element 310 includes two predefined choices, which correspond to path 2 312 and path 3 318. Both path 2 312 and path 3 318 lead to subsequent activities. Path 2 312 leads to activity 2 320 and linked decision element 2 330. Decision element 2 330 includes two choices, which correspond to path 6 332 and path 7 338. Path 6 332 leads to activity 4 340 and path 7 338 leads to activity 5 350.

Referring back to decision 1 310, path 3 318 leads to activity 3 360 and linked decision element 3 370. Decision 3 370 includes three choices, which correspond to path 8 372, path 9 374, and path 10 378. Path 8 372 leads to activity 5 350. Path 9 374 leads to activity 6 375. And, path 10 378 leads to activity 7 380.

Figure 3B:
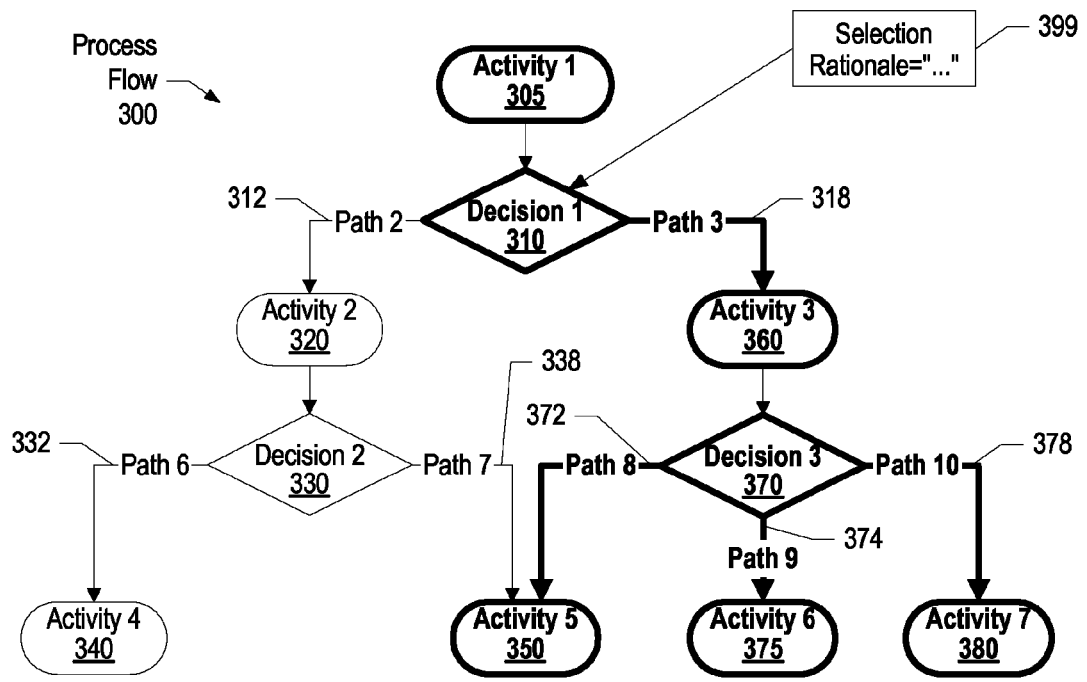
FIG. 3B is a process flow that a method advisor refines based upon a user's choice selections.

Based upon a user's choice selections, a method advisor removes particular downstream activity elements and downstream decision elements from process flow 300 in order to guide a user through an architectural decision process (see FIG. 3B and corresponding text for further details).

FIG. 3B is a process flow that a method advisor refines based upon a user's choice selections. A user performs activity 1 305 and the method advisor presents the user with a key decision, decision 1 310. Decision 1 310 presents the choices, considerations and consequences to the user to allow the user to make the correct decision, which the method advisor documents along with the user's rationale.

FIG. 3B shows that the user provides choice selection 399 to the method advisor, which selects path 3 318. As a result, the project manager removes all of the downstream activity elements and downstream decision elements only reachable through path 2 312, which encompasses removing activity element 2 320, decision element 2 330, and activity element 4 340. In addition, the method advisor removes corresponding path 6 332 and path 7 338 from process flow 300. However, since activity 5 550 is reachable from both path 2 312 and path 3 318, activity 5 350 is still presented to the user. As a result, process flow now includes elements 350-380 and paths 372, 374, and 378. for a user to choose.

Figure 4:
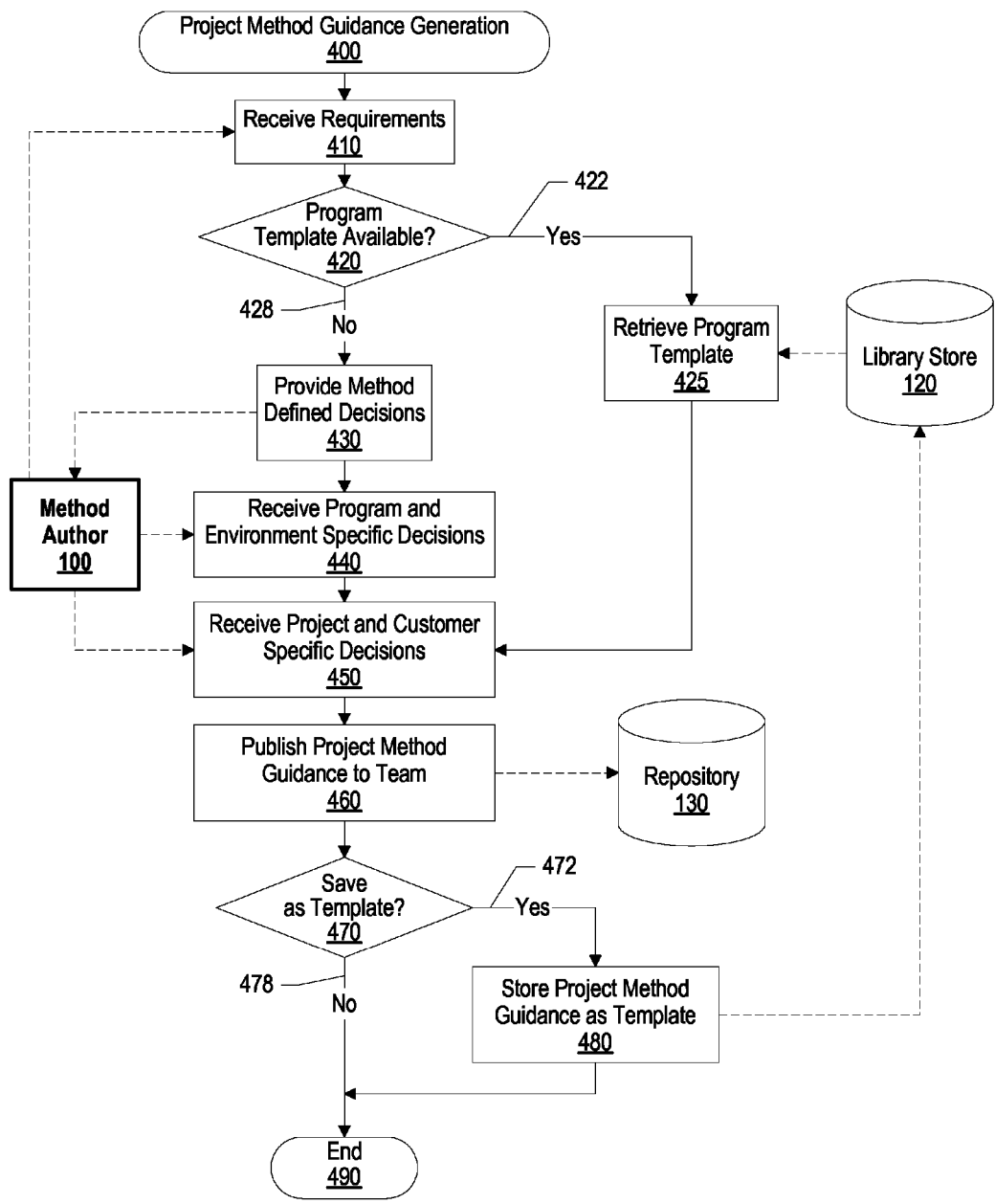
FIG. 4 is a flowchart showing steps taken in a method author generating a project-specific method that includes first class decision elements.

FIG. 4 is a flowchart showing steps taken in a method author generating a project-specific method that includes first class decision elements. Processing commences at 400, whereupon method author 100 provides project requirements at step 410. A determination is made as to whether a program template exists in library store 120 that meets the requirements (decision 420). For example, a project template may be a "delivery process" in RUP, or an "engagement model" in GS Method. Method author 100 and library store 120 are the same as that shown in FIG. 1.

If a template is available, decision 420 branches to "Yes" branch 422 whereupon processing retrieves the program template from library store 120 at step 425. On the other hand, if a template is not available, decision 420 branches to "No" branch whereupon processing provides method defined decisions to method author 100 at step 430. Method author 100 reviews the set of decision attributes included in the library to see which decisions are applicable to the project. In one embodiment, these decisions that are included in a base method library are high-level and generic. Once reviewed, method author 100 provides program-specific and/or environment-specific decision attributes, which may include more detail (step 440). Next, method author 100 provides customer and/or project specific decision attributes at step 450.

At step 460, processing publishes a project-specific method, which includes decision elements corresponding to the decision attributes discussed above, and stores the project-specific method in repository 130. A user may then retrieve the project-specific method from repository 130, which guides the user during architectural decisions (see FIG. 5 and corresponding text for further details). Repository 130 is the same as that shown in FIG. 1.

A determination is made as to whether to save the project-specific method as a template (decision 470). If processing should save the project-specific method as a template, decision 470 branches to "Yes" branch 472 whereupon processing stores the project-specific method as a template in library store 120. On the other hand, if method author 100 does not wish to save the project-specific method as a template, decision 470 branches to "No" branch 478 bypassing project-specific method storing steps. Processing ends at 490.

Figure 5:
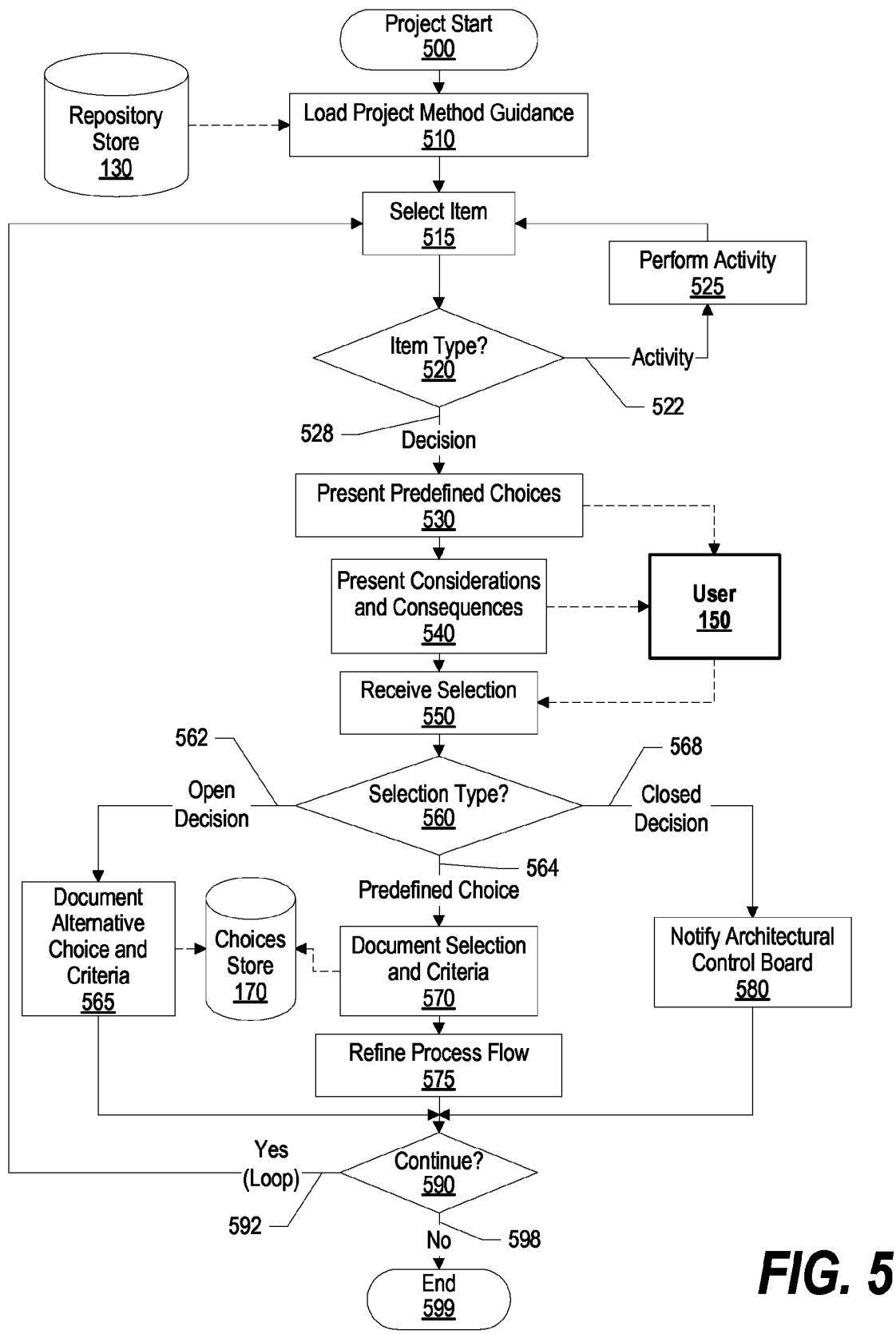
FIG. 5 is a flowchart showing steps taken in a method advisor guiding a user through architectural decisions using a project-specific method that includes first class decision elements.

FIG. 5 is a flowchart showing steps taken in a method advisor guiding a user through architectural decisions using a project-specific method that includes first class decision elements. Processing commences at 500, whereupon processing loads a project-specific method from repository store 130 (step 510). A method author, such as method author 100 shown in FIG. 1, previously generated the project-specific method (see FIG. 4 and corresponding text for further details). Repository store 130 is the same as that shown in FIG. 1.

At step 515, processing selects an item included in the project-specific method. A determination is made as to whether the item is a decision element or an activity element (decision 520). If the item is an activity element, decision 520 branches to "Activity" branch 522 whereupon processing loops back to perform the activity (step 525). This looping continues until the item is a decision element, at which point decision 520 branches to "Decision" branch 528.

Processing presents predefined choices corresponding to the decision element to user 150 at step 530. The predefined choices are stored in a choice sub-element that corresponds to the decision element. Processing also presents considerations and consequences to user 150 (step 540). The considerations and consequences are also stored in sub-elements that correspond to the decision element (see FIG. 2 and corresponding text for further details). User 150 is the same as that shown in FIG. 1.

Based upon the choices, considerations, and consequences, user 150 provides a choice selection at step 550. A determination is made as to whether the choice selection is an open decision, a closed decision, or a predefined choice (decision 560). For example, user 150 may not choose one of the predefined choices and, instead, provide an "open" choice selection or a "closed" choice selection. An open choice selection describes an alternative choice that is not included in the predefined choices. A closed choice selection constrains user 150 to choose between one or more documented choices.

If the choice selection is an open choice selection, decision 560 branches to "Open Choice" branch 562, whereupon processing documents an alternative choice and its corresponding criteria in choices store 170. On the other hand, if the choice is a closed choice selection, decision 560 branches to "Closed Choice" branch 568 whereupon processing notifies an architectural control board, which investigates the situation and takes appropriate action, such as adding a new predefined choice. Choices store 170 is the same as that shown in FIG. 1.

On the other hand, if user 150 selects a predefined choice, decision 560 branches to "Predefined Choice" branch 564 whereupon processing stores the choice selection and its corresponding criteria in choices store 170. At step 575, processing refines the process flow based upon the choice selection. Meaning, processing removes downstream activity elements and downstream decision elements that are not reachable by a path corresponding to the choice selection (see FIG. 3B and corresponding text for further details).

A determination is made as to whether to continue processing (decision 590). If processing should continue, decision 590 branches to "Yes" branch 592, which loops back to process another item. This looping continues until processing should terminate, at which point decision 590 branches to "No" branch 598, whereupon processing ends at 599.

Figure 6:
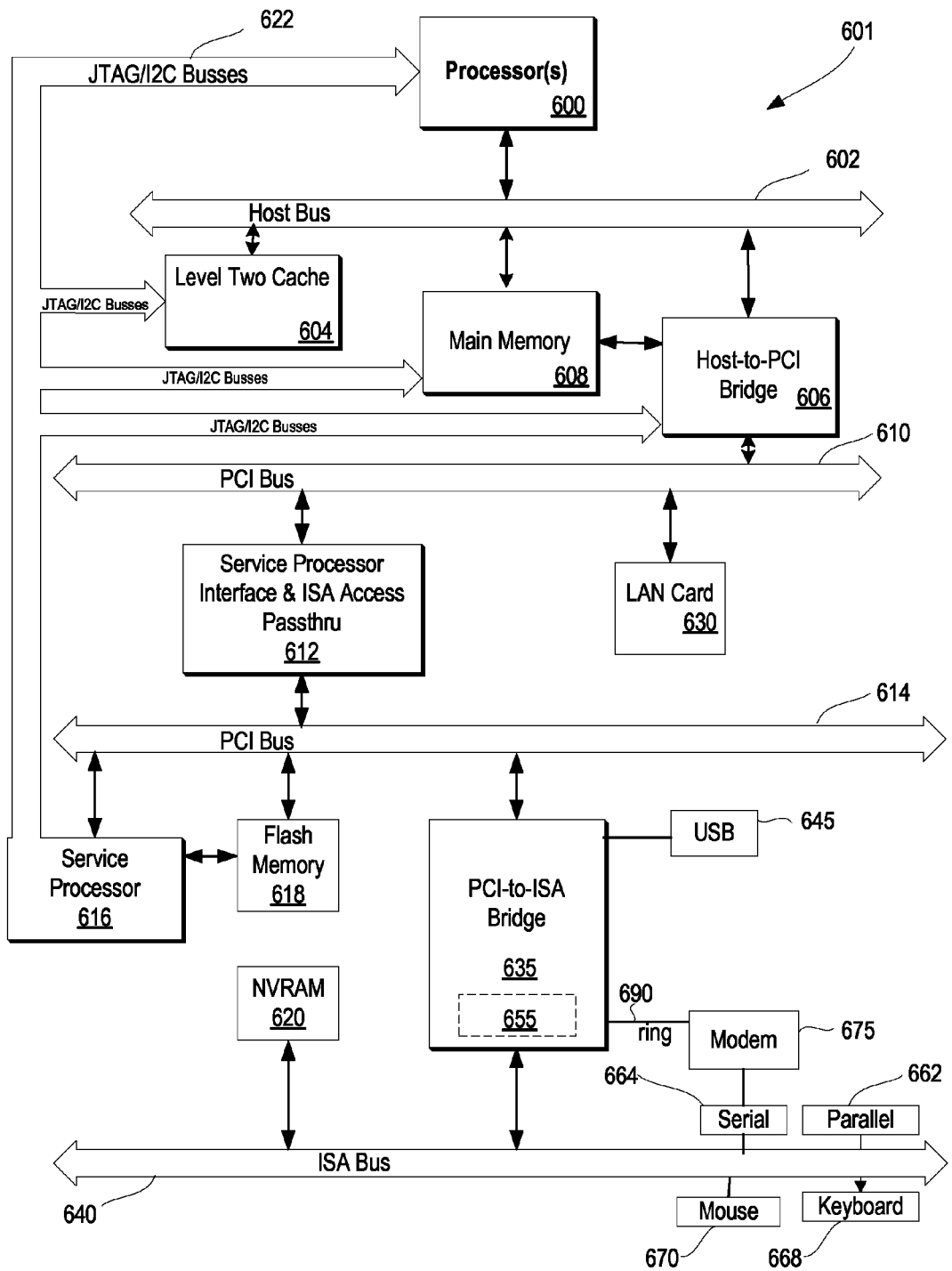
FIG. 6 is a block diagram of a computing device capable of implementing the present invention.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 665 is connected to serial port 664 and PCI-to-ISA Bridge 635.

While FIG. 6 shows one information handling system that employs processor(s) 600, the information handling system may take many forms. For example, information handling system 601 may take the form of a desktop, server, portable, laptop, notebook, or other form factor computer or data processing system. Information handling system 601 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for guiding architectural decisions, the computer-implemented method comprising:

receiving decision attributes from a method author;

creating a decision element based upon the decision attributes, wherein the decision element is a first class element linked to an activity element;

linking a choice sub-element to the decision element, wherein the choice sub-element includes a first choice and a second choice;

incorporating the decision element in a project-specific method, wherein the project-specific method corresponds to a process flow that includes a plurality of decision elements coupled to a plurality of activity elements, the created decision element included in the plurality of decision elements and the linked activity element included in the plurality of activity elements;

publishing the project-specific method;

in response to publishing the project-specific method, receiving a choice selection from a user corresponding to the first choice; and storing the choice selection corresponding to the first choice and criteria associated with the selection.

2. The method of claim 1 further comprising:

in response to receiving the choice selection, refining the process flow such that downstream activity elements and downstream decision elements that are only accessible by selecting the second choice are not provided to the user.

3. The method of claim 1 further comprising:

receiving a request from the user to view the stored choice selection and the stored criteria; and in response to receiving the request, providing the stored choice selection and the stored criteria to the user.

4. The method of claim 3 wherein the providing results in the user being able to view one or more of the user's previous architectural decisions.

5. The method of claim 1 wherein, prior to receiving the choice selection, the method further comprises:

presenting the first choice and the second choice to the user; and presenting one or more considerations and one or more consequences to the user that correspond to the first choice and the second choice.

6. The method of claim 1 wherein a consideration sub-element, a choice sub-element, and a consequence sub-element are linked to the decision element.

7. A computer program product stored on a tangible computer operable media, the tangible computer operable media containing instructions for execution by a computer, which, when executed by the computer, cause the computer to implement a method of guiding architectural decisions, the method comprising:

receiving decision attributes from a method author;

creating a decision element based upon the decision attributes, wherein the decision element is a first class element linked to an activity element;

linking a choice sub-element to the decision element, wherein the choice sub-element includes a first choice and a second choice;

incorporating the decision element in a project-specific method, wherein the project-specific method corresponds to a process flow that includes a plurality of decision elements coupled to a plurality of activity elements, the created decision element included in the plurality of decision elements and the linked activity element included in the plurality of activity elements;

publishing the project-specific method;

in response to publishing the project-specific method, receiving a choice selection from a user corresponding to the first choice; and storing the choice selection corresponding to the first choice and criteria associated with the selection.

8. The computer program product of claim 7 wherein the method further comprises:

in response to receiving the choice selection, refining the process flow such that downstream activity elements and downstream decision elements that are only accessible by selecting the second choice are not provided to the user.

9. The computer program product of claim 8 wherein the method further comprises:

receiving a request from the user to view the stored choice selection and the stored criteria; and in response to receiving the request, providing the stored choice selection and the stored criteria to the user, which results in the user being able to view one or more of the user's previous architectural decisions.

10. The computer program product of claim 8 wherein, prior to receiving the choice selection, the method further comprises:

presenting the first choice and the second choice to the user; and presenting one or more considerations and one or more consequences to the user that correspond to the first choice and the second choice.

11. The computer program product of claim 7 wherein a consideration sub-element, a choice sub-element, and a consequence sub-element are linked to the decision element.

12. An information handling system for guiding architectural decisions, the information handling system comprising:

one or more processors;

a memory accessible by the processors;

one or more nonvolatile storage devices accessible by the processors; and a set of instructions stored in the memory, wherein one or more of the processors executes the set of instructions in order to perform actions of:

receiving decision attributes from a method author;

creating a decision element based upon the decision attributes, wherein the decision element is a first class element linked to an activity element;

linking a choice sub-element to the decision element, wherein the choice sub-element includes a first choice and a second choice;

incorporating the decision element in a project-specific method, wherein the project-specific method corresponds to a process flow that includes a plurality of decision elements coupled to a plurality of activity elements, the created decision element included in the plurality of decision elements and the linked activity element included in the plurality of activity elements;

publishing the project-specific method;

in response to publishing the project-specific method, receiving a choice selection from a user corresponding to the first choice; and storing the choice selection corresponding to the first choice and criteria associated with the selection.

13. The information handling system of claim 12 wherein the information handling system further comprises an additional set of instructions in order to perform actions of:

in response to receiving the choice selection, refining the process flow such that downstream activity elements and downstream decision elements that are only accessible by selecting the second choice are not provided to the user.

14. The information handling system of claim 13 further comprising an additional set of instructions in order to perform actions of:

receiving a request from the user to view the stored choice selection and the stored criteria; and in response to receiving the request, providing the stored choice selection and the stored criteria to the user, which results in the user being able to view one or more of the user's previous architectural decisions.

15. The information handling system of claim 13 further comprising an additional set of instructions in order to perform actions of:

prior to receiving the choice selection, presenting the first choice and the second choice to the user; and presenting one or more considerations and one or more consequences to the user that correspond to the first choice and the second choice.

16. The information handling system of claim 12 wherein a consideration sub-element, a choice sub-element, and a consequence sub-element are linked to the decision element.

* * * * *